(12) United States Patent
Backman

(10) Patent No.: US 12,313,318 B2
(45) Date of Patent: May 27, 2025

(54) LOW GWP CASCADE REFRIGERATION SYSTEM

(71) Applicant: BMIL Technologies, LLC, Morehead City, NC (US)

(72) Inventor: Thomas J. Backman, Morehead City, NC (US)

(73) Assignee: BMIL Technologies, LLC, Morehead City, NC (US)

( * ) Notice: Subject to any disclaimer, the term of this patent is extended or adjusted under 35 U.S.C. 154(b) by 299 days.

(21) Appl. No.: 17/959,165

(22) Filed: Oct. 3, 2022

(65) Prior Publication Data

US 2024/0053064 A1 Feb. 15, 2024

Related U.S. Application Data

(60) Provisional application No. 63/397,801, filed on Aug. 12, 2022.

(51) Int. Cl.
*F25B 7/00* (2006.01)
*C09K 5/04* (2006.01)

(52) U.S. Cl.
CPC ............ *F25B 7/00* (2013.01); *C09K 5/042* (2013.01); *C09K 5/044* (2013.01); *C09K 2205/106* (2013.01); *C09K 2205/12* (2013.01); *C09K 2205/122* (2013.01); *C09K 2205/126* (2013.01); *C09K 2205/22* (2013.01)

(58) Field of Classification Search
CPC ...... F25B 7/00; F25B 9/008; F25B 2400/121; C09K 5/042; C09K 5/044; C09K 2205/106; C09K 2205/12; C09K 2205/122; C09K 2205/126; C09K 2205/22

See application file for complete search history.

(56) References Cited

U.S. PATENT DOCUMENTS

| 8,291,723 B1 * | 10/2012 | Backman ................ F25B 9/002 |
| | | 62/502 |
| 9,482,443 B1 | 11/2016 | Backman |
| 10,543,737 B2 * | 1/2020 | Kujak .................. B60H 1/3226 |

(Continued)

FOREIGN PATENT DOCUMENTS

| EP | 2623914 A1 * | 8/2013 | ......... F28D 20/0034 |
| JP | 2012-184873 A | 9/2012 | |
| KR | 10-2005-0055319 A | 6/2005 | |

OTHER PUBLICATIONS

Tom Wolgamot; "Case Study: The First Commercial Propane/Carbon Dioxide Cascade Refrigeration System in North America"; Technical Paper #2 (Commercial); North America Sustainable Refrigeration Council; IIAR 2019; pp. 1-38.

(Continued)

*Primary Examiner* — Lionel Nouketcha
(74) *Attorney, Agent, or Firm* — Gordon Rees Scully & Mansukhani, LLP

(57) ABSTRACT

A refrigeration system having a low stage and a high stage circuit. Each stage having a compressor, an evaporator or a condenser. The low stage includes a low stage refrigerant comprising R744. The high stage includes a high stage refrigerant having a GWP less than 500. The system further includes a heat exchanger configured to transfer heat from the low stage refrigerant to the high stage refrigerant allowing the circuits to provide cooling in two stages.

18 Claims, 5 Drawing Sheets

(56) References Cited

U.S. PATENT DOCUMENTS

| | | |
|---|---|---|
| 11,351,842 B2 | 6/2022 | Kujak et al. |
| 11,371,758 B2 | 6/2022 | Nakamura |
| 2009/0133412 A1* | 5/2009 | Narayanamurthy .... F25D 16/00 62/66 |
| 2012/0210736 A1* | 8/2012 | Rockenfeller ............ F25B 7/00 62/115 |
| 2013/0111904 A1* | 5/2013 | Stiesdal .................. F28D 17/04 165/104.31 |
| 2015/0153086 A1* | 6/2015 | Takayama ................ F25B 7/00 62/228.3 |
| 2016/0250906 A1* | 9/2016 | Xia ........................ B60H 1/143 165/202 |
| 2019/0277551 A1 | 9/2019 | Picouet |

OTHER PUBLICATIONS

Refrigeration Manual; Part 4—System Design; Copeland Brand Products; Emerson Climate Technologies; 1969 (See pp. 66-69).
International Search Report and Written Opinion dated Nov. 28, 2023 issued by the International Searching Authority in related International Application No. PCT/US2023/030175; filed Aug. 14, 2023.

* cited by examiner

Low Stage Pressure Enthalpy Diagram

Pressure-Enthalpy Diagram for Refrigerant 744 (Carbon Dioxide)

LOW GWP CASCADE REFRIGERATION SYSTEM

CROSS-REFERENCE TO RELATED APPLICATION

This application claims priority to and the benefit of U.S. Provisional Patent Application No. 63/397,801, filed Aug. 12, 2022, which is incorporated by reference herein in its entirety.

BACKGROUND

In order to protect the global ozone layer, only zero ozone depletion potential (0 ODP) refrigerants are utilized globally in new commercial refrigeration systems. Due to global warming concerns, there is a global goal to set a top end threshold of 500 Global Warming Potential (GWP) for refrigerants utilized in mechanical cooling. Mechanical cooling applications are often categorized as high temperature, or air conditioning, and low temperature, or refrigeration. Some blend refrigerants are now available with GWP under the 500 threshold, but they have flammability or toxicity issues. These low GWP flammable refrigerants are not generally suitable for use in indoor refrigeration systems.

The natural refrigerants such as R717 (ammonia), R744 ($CO_2$), and R290 (propane) are all below the 500 GWP line. These refrigerants all have technical issues that must be addressed for normal use in commercial refrigeration.

been employed in order to meet the low temperature requirements. These cascade refrigeration systems utilize one refrigerant for a low stage refrigeration system. The −30° F. low stage refrigeration system rejects the high side heat, condenser heat, to the condenser side of a heat exchanger. The high stage refrigeration system removes the condenser heat through the evaporator side of the cascade heat exchanger. This design allows the refrigeration systems to have higher, efficiency, less horsepower, lower pressures and lower discharge temperatures.

In order to operate sub 500 GWP A1 refrigeration systems with indoor components the natural refrigerant R744 (CO2) appears to be a suitable choice. However, R744 based refrigeration systems have issues with high discharge pressures and operating envelopes above the critical point of the refrigerant. Operation of refrigeration systems in the supercritical domain adds significant complexity requiring added controls, valving, and high-pressure components. This complexity leads to a tripling or quadrupling of the cost of a low temperature refrigeration system. Additionally, if an R744 refrigeration system loses power, the refrigerant in the system gradually warms up. At a temperature of 85° F., R744 will be at a pressure 1,108 psi above the atmosphere. This pressure exceeds the operating pressure of most refrigeration system tanks, so the refrigerant charge has to be released to atmosphere through a pressure relief device if the power outage is long enough for the R744 refrigerant to warm up to 85° F. anywhere within the system. Thus, as described herein, certain improvements are provided to a

| Refrigerant | AHSRAE Std. 34 Safety Rating | GWP | Operating Range | Technical challenges |
|---|---|---|---|---|
| R717 (Ammonia) | B2L | 0 | Low and High | *High discharge temps at condensing temps that occur with normal ambient condenser temps *Toxicity |
| R744(CO2) | A1 | 1 | Low and High | High pressures temps at normal ambient condenser temps *Complicated supercritical operation at condensing temps over 80 F. |
| R290 (Propane) | A3 | 4 | Low and High | Flammability, limited to 0.33 lbs per system |
| Blends such as R454C and R455A | A2L | 6 | High | Not rated for low temperature refrigeration |

| SAFETY GROUP | | | |
|---|---|---|---|
| INCREASING FLAMMABILITY ↑ | Higher Flammability | A3 | B3 |
| | Flammable | A2 | B2 |
| | Lower Flammability | A2L | B2L |
| | No Flame Propagation | A1 | B1 |
| | | Lower Toxicity | Higher Toxicity |
| | | INCREASING TOXICITY → | |

As commercial refrigeration solutions are sought in order to reach the sub 500 GWP refrigeration system goal, one can omit systems with refrigerant larger refrigerant charges, perhaps more than 10 lbs, for indoor use due to the code, or end user, mandated maximum indoor charge of A2 and A3 refrigerants. In low temperature refrigeration systems operating below −30° F., cascade refrigeration systems have cascade refrigeration system in order to provide for the use a sub 500 GWP A1 refrigerant.

SUMMARY

Using a cascade refrigeration system it is possible to achieve sub 500 GWP using the A1 natural refrigerant R744 on all indoor components of the system. In order to minimize pressures, and therefore component cost, the R744 refrigeration cycle is limited to a saturated condensing temperature of 80° F., or less. This low condensing temperature is achieved by employing a cascade refrigeration design. Certain sub 500 GWP refrigerants are A2L flammable refrigerants. The high stage refrigeration system that employs a sub 500 GWP refrigerant that has a flammability rating of A2L is installed outdoors (i.e., outside an enclosed structure, contained facility or building) due to the flammability issues of A2L refrigerants. The high stage system can utilize certain newly developed sub 500 GWP A2L such as R454C and R455A in order to provide a suitable high stage solution in a cascade refrigeration system, The majority of the commercial refrigeration market is made up of refrigeration systems with air cooled condensing units (ACCUs), 2 hp to 500 hp, with refrigerant charge from 10 lb to 300 lb, that operate stand alone with the exception of occasional contractor visits for preventative maintenance or repairs.

As described herein, an improved sub 500 GWP cascade refrigeration system utilizing air cooled condensing units (ACCU) for the commercial refrigeration market with sub 500 GWP A2L refrigerants may be employed. The preferred refrigeration system includes positioning the entire A2L refrigerant charge contained outdoors, in the high stage cycle, and positioning the R744 natural refrigerant indoors on the low stage for fluid connection to evaporators. In this design, the 500 GWP A2L refrigerant stays inside the outdoor ACCU cabinet, cooling a cascade heat exchanger through evaporation, compression, condensation and expansion. The low stage natural refrigerant R744 liquid flows out of the ACCU through an expansion device, to the evaporator to pick up a heat load, and then return back to the ACCU through a suction line for compression and condensation at lower temperature and pressures than a single stage ACCU.

Thermal energy storage may be employed in a cascade refrigeration system. When a cascade refrigeration system is installed with a thermal energy storage reservoir surrounding cascade heat exchanger (CHX), then there is a passive buffer available to more evenly maintain condensing temperature for R744 ($CO_2$) or R717 (ammonia) between 65 and 85° F. without the addition active valving or controls. In addition, in the event of a power outage, the thermal energy storage reservoir will maintain an R744 ($CO_2$) system saturation temperature below 85° F. for a longer time, up to one week, during a power outage, preventing a release of the system refrigeration charge due to pressure increase.

Another cascade refrigeration system can be installed with a thermal energy storage reservoir surrounding cascade refrigerant receiver, or flash tank, for the benefit that in the event of a power outage, the thermal energy storage reservoir will maintain an R744 ($CO_2$) system saturation temperature below 85° F. for a longer time, up to one week, during a power outage, preventing a release of the system refrigeration charge due to pressure increase.

BRIEF DESCRIPTION OF THE DRAWINGS

The features, aspects, and advantages of the disclosed deliver system will become apparent from the following description, and the accompanying exemplary embodiments shown in the drawings, which are briefly described below.

DESCRIPTION

An exemplary embodiment of a refrigeration system for an enclosed structure capable of sheltering personnel is disclosed herein. The refrigeration system includes a high stage refrigeration circuit including a high stage compressor, a condenser, a high stage expansion device, wherein the high stage refrigeration circuit circulates a high stage refrigerant having a GWP less than 500. The system further includes a low stage refrigeration circuit including a low stage compressor, a low stage expansion device, and an evaporator, wherein the low stage refrigeration circuit is configured to circulate a low stage refrigerant comprising R744. The evaporator is configured to be located within the enclosed structure and the condenser is configured to be located outside the structure. The system further includes a heat exchanger configured to transfer heat from the low stage refrigerant to the high stage refrigerant.

According to another embodiment, a refrigeration system for a building is disclosed. The refrigeration system includes a high stage refrigeration circuit including a high stage compressor, a condenser upstream of the high stage compressor, a high stage refrigerant receiver downstream of the condenser, a high stage expansion device downstream of the high stage refrigerant receiver. The high stage refrigeration circuit circulates a high stage refrigerant having a GWP less than 500 and a flammability classification of A2 or A2L. The system further includes a low stage refrigeration circuit including a low stage compressor, an evaporator upstream of the low stage compressor, a low stage expansion device upstream of the evaporator, and a low stage refrigerant receiver upstream of the low stage expansion device, wherein the low stage refrigeration circuit is configured to circulate a low stage refrigerant comprising R744. The evaporator is configured to be located within the building and the condenser is configured to be located outside the building. The system further includes a heat exchanger downstream of the low stage compressor and upstream of the high stage compressor configured to transfer heat from the low stage refrigerant to the high stage refrigerant.

Figure 1:
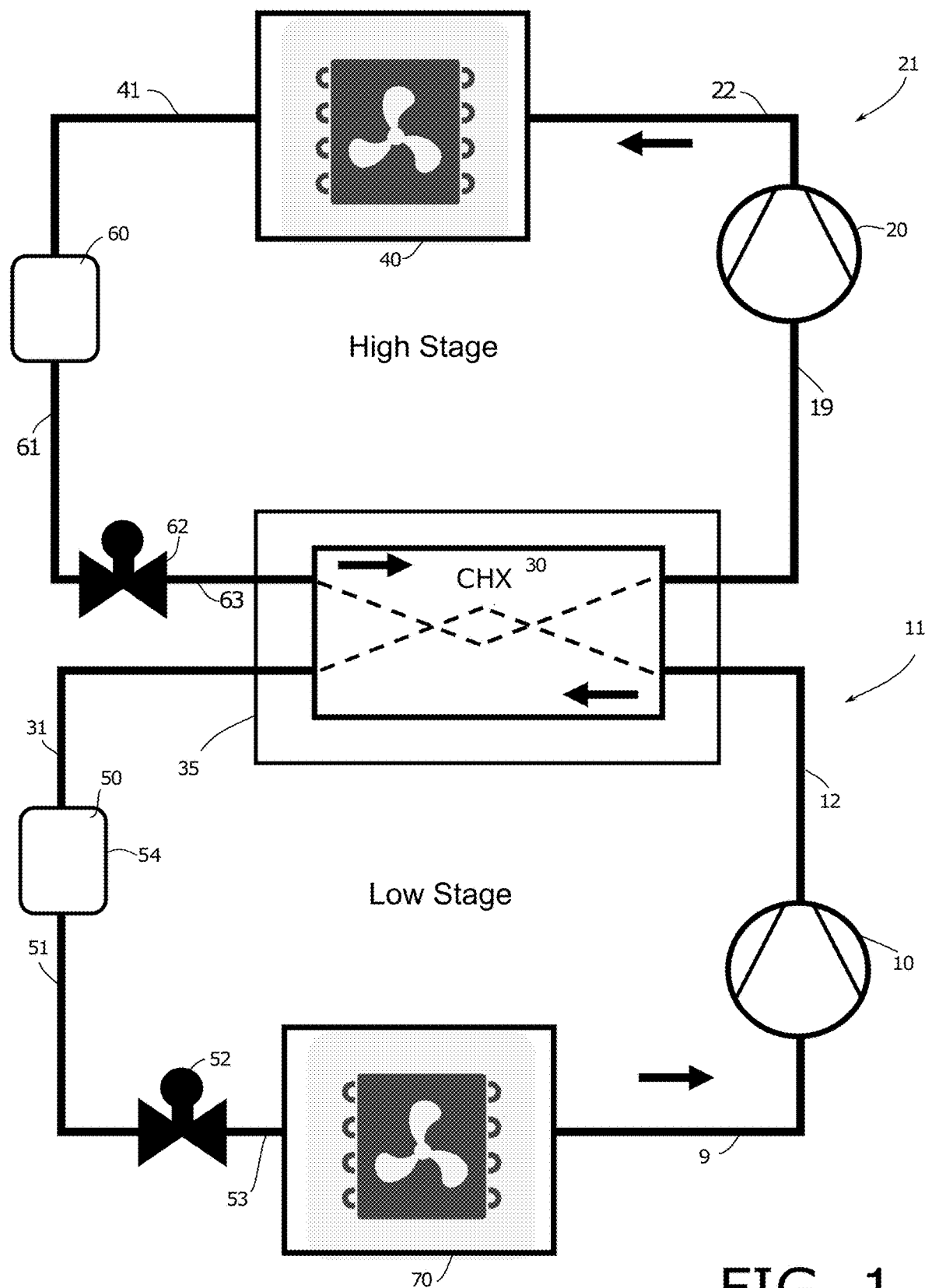
FIG. 1 is a simplified diagram of a cascade refrigeration system.

Referring to FIG. 1, there is a low stage refrigeration system 11 that utilizes R744 ($CO_2$) to cool a stationary cold room or cold cabinet by the effect of evaporator 70. Compressor 10 compresses R744 refrigerant to a hot, high-pressure gas through discharge pipe 12 that leads to Cascade Heat Exchanger (CHX) 30. CHX 30 discharges waste heat and causes the hot R744 refrigerant gas to cool down and become warm R744 refrigerant liquid at 85° F. or cooler. The warm refrigerant liquid passes through pipe 31 to receiver 50. Then the R744 liquid refrigerant passes to pipe 51 to expansion device 52, then through pipe 53 to evaporator 70. In Evaporator 70 the refrigerant absorbs heat and passes through pipe 9 to the R744 refrigeration low stage compressor 10. For a cold storage application, the evaporator 70 would be in a walk-in refrigerator or a refrigerated warehouse. For a supermarket, evaporator 9 could be in a refrigerated merchandiser. There may be a multiple of evaporators 70 piped in a parallel arrangement.

The CHX 30 may be surrounded by optional thermal energy storage reservoir 35. The reservoir may be included in order to extend the time until refrigerant will be vented through the pressure relief device during a power outage.

Figure 3:
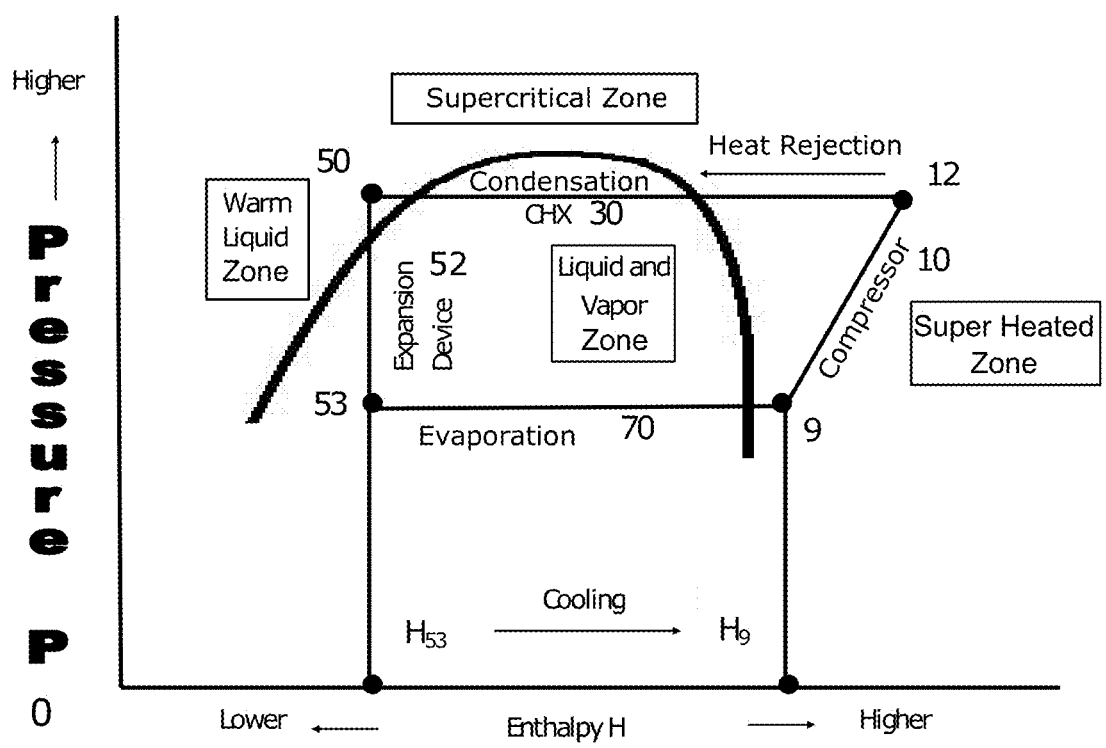
FIG. 3 is a pressure enthalpy diagram of the low stage circuit refrigerant of the cascade refrigeration system.

FIG. 3 is a low stage refrigeration system pressure enthalpy diagram. Compressor 10 compresses R744 refrigerant to a hot, high-pressure gas through discharge pipe 12 that leads to Cascade Heat Exchanger (CHX) 30. CHX 30 lowers the refrigerant enthalpy, causing the hot R744 refrigerant gas to condense and become warm R744 refrigerant liquid at 85° F. or cooler. The warm refrigerant liquid passes through pipe 31 to receiver 50. Then the R744 refrigerant passes on to expansion device 52, then through pipe 53 to evaporator 70. The expansion device lowers the pressure of the low stage refrigerant gas. In evaporator 70, the refrigerant absorbs heat and passes through the pipe 9 to the R744 refrigeration low stage compressor. The cooling effect of the refrigeration unit at the low stage is due to this heat absorption by the evaporator and thus causes an increase in enthalpy from $H_{53}$ to $H_9$ in the low stage refrigeration circuit upstream of the compressor 10.

Referring to FIG. 1, there is high stage refrigeration system 21 that utilizes a sub 500 GWP A2L refrigerant to cool Cascade Heat Exchanger (CHX) 30. CHX 30 acts as a low stage R744 condenser. Refrigeration system 21 absorbs heat due to the refrigeration effect in CHX 30. Compressor 20 compresses the sub 500 GWP A2L refrigerant to a hot, high-pressure gas through discharge pipe 22 that leads to air cooled condenser 40. Air cooled condenser 40 discharges waste heat to ambient and causes the hot sub 500 GWP A2L refrigerant gas to cool down and become warm sub 500 GWP A2L refrigerant liquid at 129° F. or cooler. The warm refrigerant liquid passes through pipe 41 to receiver 60. Then the sub 500 GWP A2L refrigerant passes through pipe 61 to expansion device 62, then through pipe 63 to the cold side of the CHX 30 for evaporation. In CHX 30, the expanding refrigerant absorbs heat and passes through pipe 19 to the sub 500 GWP A2L refrigerant high stage compressor.

Figure 2:
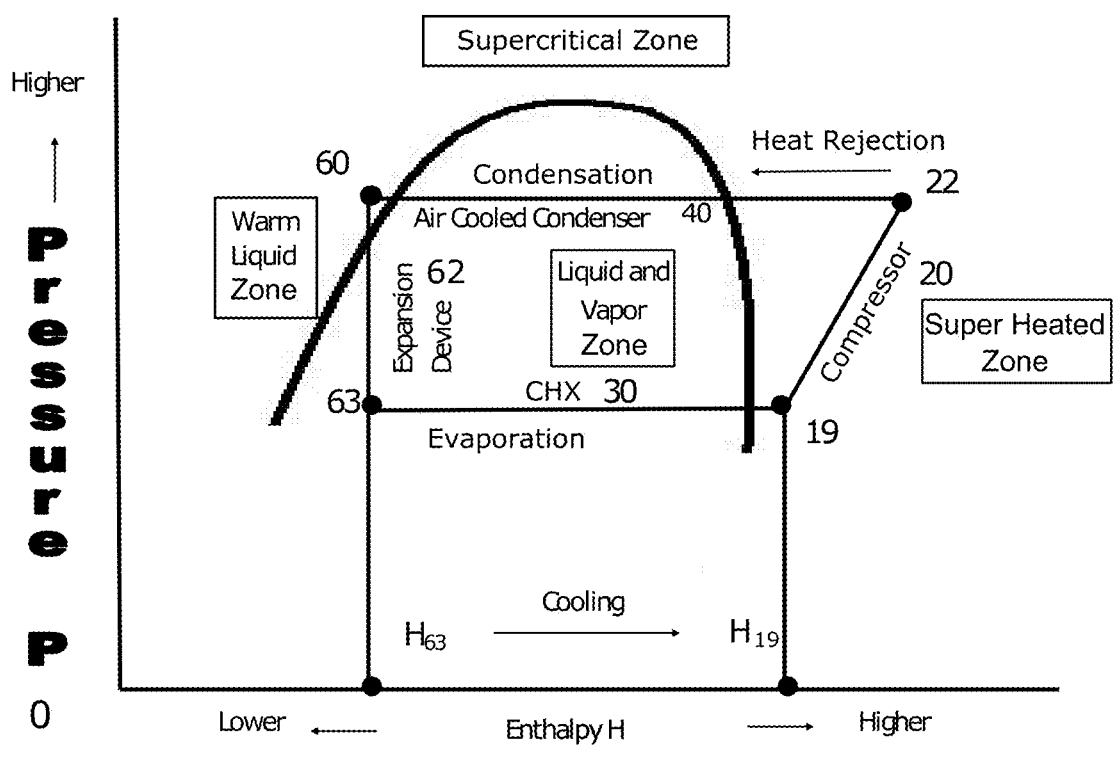
FIG. 2 is a pressure enthalpy diagram of the high stage circuit refrigerant of the cascade refrigeration system.

Referring to FIG. 2, there is a high stage refrigeration system pressure enthalpy diagram. Compressor 20 compresses sub 500 GWP A2L refrigerant to a hot, high-pressure gas through discharge pipe 22 that leads to air cooled condenser 40. The air cooled condenser 40 lowers the refrigerant enthalpy, causing the hot sub 500 GWP A2L gas to condense and become warm sub 500 GWP A2L liquid at 129° F. or cooler. The warm refrigerant liquid passes through pipe 41 to receiver 60. Next, the sub 500 GWP A2L passes on to expansion device 62, then through pipe 63 to CHX 30. In CHX 30, the high stage refrigerant absorbs heat from the low stage refrigerant and passes through pipe 19 to the high stage compressor 20. The heat absorption from CHX 30 causes enthalpy to increase from H 63 to Hi 9 in the high stage refrigeration circuit upstream of the compressor 20.

Figure 5:
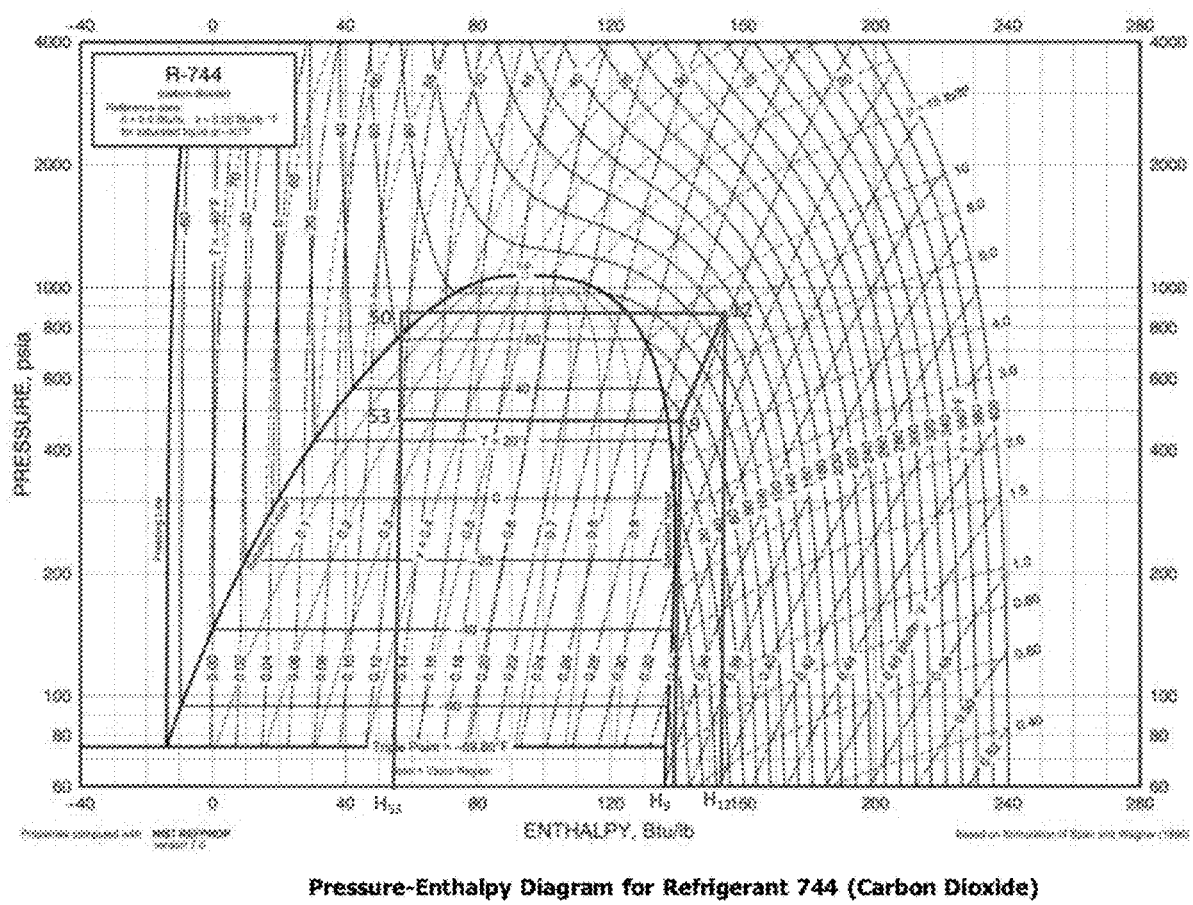
FIG. 5 is a pressure enthalpy diagram of R744 as a low stage refrigerant of the cascade refrigeration system.

Referring to FIG. 5, there is cascade refrigeration system represented with a low stage R744 pressure enthalpy diagram and a high stage R452C pressure enthalpy diagram. Low stage evaporation is happening at 25° F. saturated suction temperature with the refrigerant enthalpy rising from $H_{53}$ of 55 btu/lb to $H_9$ 142 btu/lb for cooling a 35° F. cold storage warehouse. Low stage condensation is happening at 70° F. saturated discharge temperature. The refrigeration effect of this low stage system equals the low stage compressor mass flow ($\mathcal{M}_{low}$) in btu/min. times a change in enthalpy of $142-55 \times \mathcal{M}_{low} \times 60 = 5,220 \; \mathcal{M}_{low}$ btu/hr. The heat of rejection of this low stage system equals the compressor mass flow ($\mathcal{M}$) in btu/min. times a change in enthalpy as $H_{12}$ of $182-H_{63}$ of $55 \times \mathcal{M}_{low} \times 60 = 7,620 \; \mathcal{M}_{low}$ btu/hr.

Figure 4:
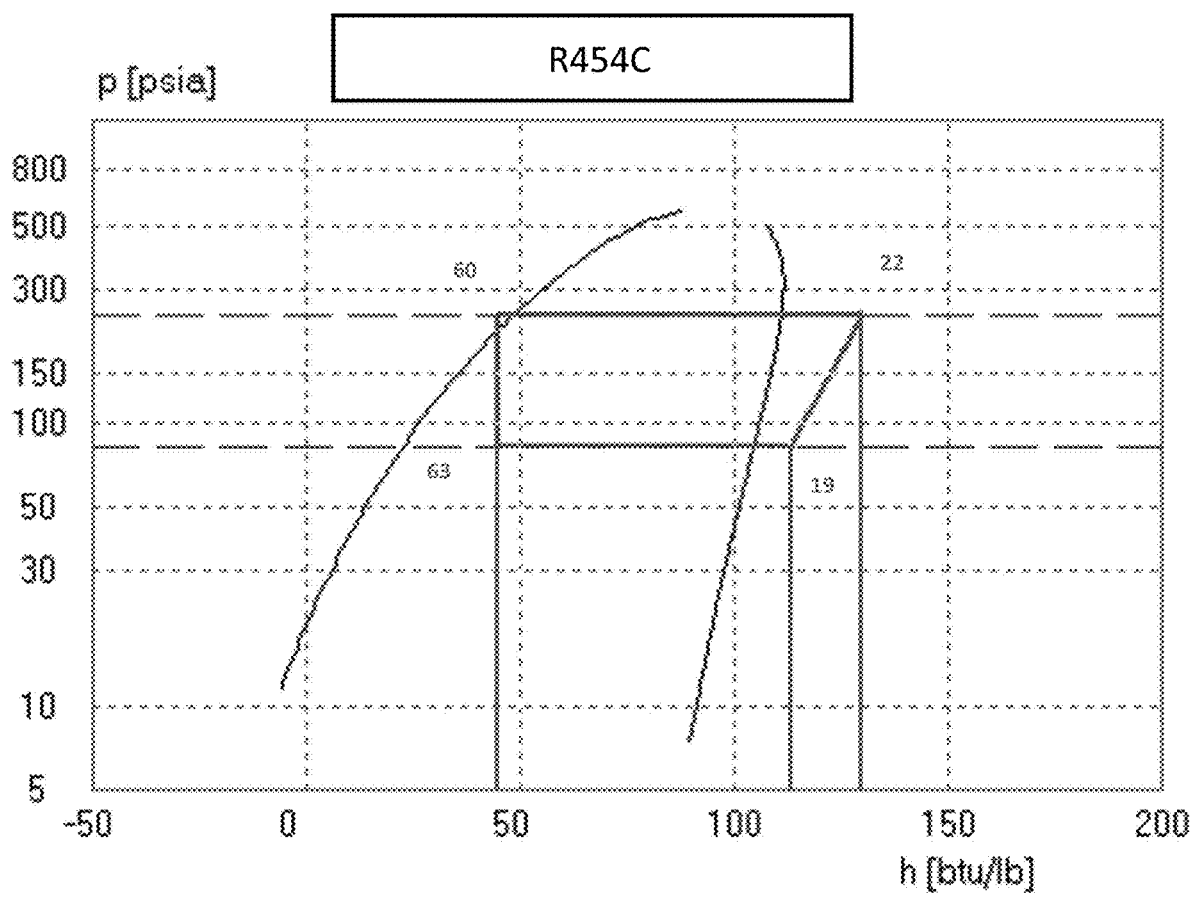
FIG. 4 is a pressure enthalpy diagram of R454C as a high stage refrigerant of the cascade refrigeration system.

Referring to FIG. 4, the same cascade refrigeration system is represented with a high stage R452C enthalpy diagram. High stage evaporation is happening at 45° F. saturated suction temperature with the refrigerant enthalpy rising from $H_{63}$ of 45 btu/lb to $H_{19}$ of 113 btu/lb for cooling CHX 30. High stage condensation is happening in the air-cooled condenser at 115° F. saturated discharge temperature. The refrigeration effect of this high stage system equals the low stage compressor mass flow ($\mathcal{M}_{thigh}$) in btu/min. times a change in enthalpy of $113-45 \times \mathcal{M}_{high} \times 60 = 4,080 \; \mathcal{M}_{high}$ btu/hr.

Since energy is conserved, this low stage heat of rejection is equal to the evaporation effect of the high stage refrigeration system. For FIG. 4, 7,620 $\mathcal{M}_{low}$ btu/hr=4,080 $\mathcal{M}_{high}$ btu/hr. Usually, the low stage refrigeration system is selected to match the mass flow required of the of the cold room cooling load. Then the high stage refrigeration system is then selected to match the mass flow required of the cascade heat exchanger CHX 30 cooling load coming from the low stage heat of rejection. In summary in this example $\mathcal{M}_{high} = 7,620 \pm 4,080 = 1.868 \; \mathcal{M}_{low}$.

Disclosed herein is an air-cooled condensing unit with a stationary cascade refrigeration system that operates on natural refrigerants that have a global warming potential (GWP) under 500. The low stage refrigeration cycle operates partially indoors preferably utilizing a natural refrigerant R744 ($CO_2$) with an A1 non-flammable and non-toxic safety rating. Although R744 is preferred, other non-flammable low GWP refrigerants may be employed in the low stage cycle. The high stage outdoor refrigeration cycle operates on a sub 500 GWP refrigerant blend with a flammability of A1, A2, or A2L.

The stationary refrigeration system may use R454C, GWP 148 as the high stage refrigerant. Alternatively, the stationary refrigeration system may use R455A, GWP 146 as the high stage refrigerant. In another embodiment, the stationary refrigeration system may use R-471A, GWP<150 as the high stage refrigerant. The stationary refrigeration system may include a configuration wherein the high stage refrigerant is R1234YF, GWP 4. In another embodiment, the stationary refrigeration system may use R290, GWP 4 as the high stage refrigerant. In still another embodiment, the stationary refrigeration system may use a blend of R-32 and R-1234yf with a GWP less than or equal to 500, but with a flammability of A1 or A2L as the high stage refrigerant. Alternatively, the stationary refrigeration system may use a blend of some or all of R-32, CO2, R277, R-1234zeE and R-1234yf with a GWP less than or equal to 500, but with a flammability of A1 or A2L as the high stage refrigerant.

In one embodiment, the stationary refrigeration system may use R744 ($CO_2$) as the low stage refrigerant and include a thermal energy storage reservoir 54 surrounding the refrigerant receiver or flash tank 50 to extend the time until refrigerant will be vented through the pressure relief device during a power outage. This embodiment utilizes coconut oil in the reservoir. The oil has a melting point of 76 to 79° F. and may be employed as a thermal energy storage medium with an intention of extending the time until the refrigerant in the powerless system rises above 85 F.

In another embodiment, the stationary refrigeration system may use R744 ($CO_2$) as the low stage refrigerant and include a thermal energy storage reservoir 54 surrounding the refrigerant receiver or flash tank 50 to extend the time until refrigerant will be vented through the pressure relief device during a power outage. This embodiment utilizes a blend of fats or oils with a melting point of 65 to 79° F. as a thermal energy storage medium in the reservoir with an intention of extending the time until the refrigerant in the powerless system rises above 85 F.

In yet another embodiment, the stationary refrigeration system may use R744 ($CO_2$) as the low stage refrigerant and include a thermal energy storage reservoir surrounding the cascade heat exchanger (CHX) to extend the time until refrigerant will be vented through the pressure relief device during a power outage. This embodiment utilizes coconut oil with a melting point of 76 to 79° F. as the a thermal energy storage medium with an intention of extending the time until the refrigerant in the powerless system rises above 85° F.

Alternatively, the stationary refrigeration system may use R744 ($CO_2$) low stage refrigerant and include a thermal energy storage reservoir surrounding the cascade heat exchanger (CHX) to extend the time until refrigerant will be vented through the pressure relief device during a power outage. This embodiment utilizes a blend of fats or oils with a melting point of 65 to 79° F. as the a thermal energy storage medium with an intention of extending the time until the refrigerant in the powerless system rises above 85° F.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that refrigeration system shown in the various exemplary embodiments is illustrative only. Although several embodiments have been described in detail in this disclosure, those skilled in the art who review this disclosure will readily appreciate that other embodiments are possible and are contained within the scope of the invention. For example, modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed:

1. A refrigeration system for an enclosed structure capable of sheltering personnel comprising:
   a high stage refrigeration circuit including a high stage compressor, a condenser, a high stage expansion device, wherein the high stage refrigeration circuit circulates a high stage refrigerant having a GWP less than 500;
   a low stage refrigeration circuit including a low stage compressor, a low stage expansion device, and an evaporator, wherein the low stage refrigeration circuit is configured to circulate a low stage refrigerant comprising R744;
   wherein the evaporator is configured to be located within the enclosed structure and the condenser is configured to be located outside the structure;
   a heat exchanger configured to transfer heat from the low stage refrigerant to the high stage refrigerant;
   wherein the low stage refrigeration circuit further comprises a low stage refrigerant receiver downstream of the heat exchanger, wherein the low stage refrigerant receiver includes a thermal energy storage reservoir configured to receive heat from the low stage refrigerant to control the temperature of the low stage refrigerant during a power outage; and
   wherein the thermal energy storage reservoir surrounds the heat exchanger, wherein the thermal energy storage reservoir includes a blend of fats or oils with a melting point of 65 to 79 degrees Fahrenheit.

2. The refrigeration system of claim 1, wherein the high stage refrigerant comprises R454C.

3. The refrigeration system of claim 1, wherein the high stage refrigerant comprises R455A.

4. The refrigeration system of claim 1, wherein the high stage refrigerant comprises R471A.

5. The refrigeration system of claim 1, wherein the high stage refrigerant comprises R1234YFA.

6. The refrigeration system of claim 1, wherein the high stage refrigerant comprises R290.

7. The refrigeration system of claim 1, wherein the high stage refrigerant comprises a blend of R-32 and R-1234yf.

8. The refrigeration system of claim 7, wherein the high stage refrigerant further comprises R744.

9. The refrigeration system of claim 1, wherein the thermal energy storage reservoir includes coconut oil.

10. The refrigeration system of claim 1, wherein the high stage refrigeration circuit further comprises a high stage refrigerant receiver.

11. A refrigeration system for an enclosed structure capable of sheltering personnel comprising:
    a high stage refrigeration circuit including a high stage compressor, a condenser, a high stage expansion device, wherein the high stage refrigeration circuit circulates a high stage refrigerant having a GWP less than 500;
    a low stage refrigeration circuit including a low stage compressor, a low stage expansion device, and an evaporator, wherein the low stage refrigeration circuit is configured to circulate a low stage refrigerant;
    wherein the evaporator is configured to be located within the enclosed structure and the condenser is configured to be located outside the structure;
    a heat exchanger configured to transfer heat from the low stage refrigerant to the high stage refrigerant; and
    wherein the low stage refrigeration circuit further comprises a low stage refrigerant receiver downstream of the heat exchanger, wherein the low stage refrigerant receiver is surrounded by a thermal energy storage reservoir configured to receive heat from the low stage refrigerant to control the temperature of the low stage refrigerant during a power outage.

12. The refrigeration system of claim 11, wherein the high stage refrigerant comprises R454C.

13. The refrigeration system of claim 11, wherein the high stage refrigerant comprises R455A.

14. The refrigeration system of claim 11, wherein the high stage refrigerant comprises R471A.

15. The refrigeration system of claim 11, wherein the high stage refrigerant comprises R1234YFA.

16. The refrigeration system of claim 11, wherein the high stage refrigerant comprises R290.

17. The refrigeration system of claim 11, wherein the high stage refrigerant comprises a blend of R-32 and R-1234yf.

18. The refrigeration system of claim 17, wherein the high stage refrigerant further comprises R744.

\* \* \* \* \*